United States Patent
Wan et al.

(10) Patent No.: US 12,273,646 B2
(45) Date of Patent: Apr. 8, 2025

(54) METHOD FOR VEHICLE HINGE POINT CALIBRATION AND CORRESPONDING CALIBRATION APPARATUS, COMPUTER DEVICE, AND STORAGE MEDIUM

(71) Applicant: CHANGSHA INTELLIGENT DRIVING INSTITUTE CORP. LTD, Hunan (CN)

(72) Inventors: Bo Wan, Hunan (CN); Meihua Peng, Hunan (CN); Rongdong Hu, Hunan (CN); Kaibin Yang, Hunan (CN); Sijuan Wang, Hunan (CN)

(73) Assignee: CHANGSHA INTELLIGENT DRIVING INSTITUTE CORP. LTD, Hunan (CN)

( * ) Notice: Subject to any disclaimer, the term of this patent is extended or adjusted under 35 U.S.C. 154(b) by 0 days.

(21) Appl. No.: 17/769,590

(22) PCT Filed: Oct. 19, 2020

(86) PCT No.: PCT/CN2020/121816
§ 371 (c)(1),
(2) Date: Apr. 15, 2022

(87) PCT Pub. No.: WO2021/073634
PCT Pub. Date: Apr. 22, 2021

(65) Prior Publication Data
US 2023/0379422 A1   Nov. 23, 2023
US 2025/0008048 A2   Jan. 2, 2025

(30) Foreign Application Priority Data
Oct. 17, 2019   (CN) .......................... 201910985902.8

(51) Int. Cl.
*H04N 5/262*   (2006.01)
*G06T 3/4038*   (2024.01)
(Continued)

(52) U.S. Cl.
CPC ......... *H04N 5/2628* (2013.01); *G06T 3/4038* (2013.01); *G06T 5/50* (2013.01);
(Continued)

(58) Field of Classification Search
CPC .. H04N 5/2628; H04N 5/2624; G06T 3/4038; G06T 5/50; G06T 7/74; G06T 2207/20212; G06T 2207/30252
See application file for complete search history.

(56) References Cited

U.S. PATENT DOCUMENTS

2015/0153170 A1* 6/2015 Gonzalez ............... G05D 1/027
                                                        701/300
2020/0294215 A1* 9/2020 Yun ........................... G06T 3/12

FOREIGN PATENT DOCUMENTS

CN        107627659 A        1/2018
CN        107627959    *    1/2018   ............... B06R 1/00
(Continued)

*Primary Examiner* — Amara Abdi
(74) *Attorney, Agent, or Firm* — Workman Nydegger

(57) ABSTRACT

The present application relates to a method for vehicle hinge point calibration, comprising: acquiring a raw image of a first portion and a second portion hinged to one another of a vehicle; adjusting, stitching and cropping the raw image to obtain respective independent surround-view images of the first portion and the second portion; and at least on the basis of the independent surround-view images of the first portion and the second portion, calculating the angle of rotation and the corresponding translation vector between the first and second portions, and thus calculating the coordinates of the respective hinge points of the first and second portions. Further comprised in the present application are an apparatus for vehicle hinge point calibration, a computer device, and a computer-readable storage medium.

11 Claims, 5 Drawing Sheets

(51) Int. Cl.
*G06T 5/50* (2006.01)
*G06T 7/73* (2017.01)

(52) U.S. Cl.
CPC .............. *G06T 7/74* (2017.01); *H04N 5/2624* (2013.01); *G06T 2207/20212* (2013.01); *G06T 2207/30252* (2013.01)

(56) References Cited

FOREIGN PATENT DOCUMENTS

| | | | | |
|---|---|---|---|---|
| CN | 108263283 | * | 7/2018 | ............... B06R 1/00 |
| CN | 108263283 A | | 1/2020 | |
| WO | 2012/145818 A1 | | 11/2012 | |

* cited by examiner

METHOD FOR VEHICLE HINGE POINT CALIBRATION AND CORRESPONDING CALIBRATION APPARATUS, COMPUTER DEVICE, AND STORAGE MEDIUM

CROSS REFERENCE TO RELATED APPLICATIONS

This application is a National Stage of PCT Application No. PCT/CN2020/121816 filed on Oct. 19, 2020, which claims priority to Chinese Patent Application No. 201910985902.8 filed on Oct. 17, 2019, the contents each of which are incorporated herein by reference thereto.

TECHNICAL FIELD

The present application involves in the field of vehicle security assist and automotive electronics, and specifically relates to a method for vehicle hinge point calibration, an apparatus for vehicle hinge point calibration, a computer device, and a storage medium.

BACKGROUND

An important constituent of modern vehicles is a kind of vehicle including at least two mutually articulated parts, such as a train, a semi-trailer, a subway and the like. At present, physical measurement methods are mainly used to obtain a panoramic view of a motion state of the vehicle, especially the above-mentioned vehicle provided with an articulated relationship, which are provided with low accuracy, complicated operations and poor adaptability.

SUMMARY

With regard to the technical problem existed in the prior art, the present application proposes a method for vehicle hinge point calibration, which includes: acquiring raw images of external environments of a first part and a second part of a vehicle hinged with each other; adjusting, stitching and/or cropping the raw images to obtain respective independent surround-view images of the first part and the second part; and calculating a rotation angle and a corresponding translation vector between the first part and the second part based at least on the independent surround-view images of the first part and the second part, thereby calculating coordinates of respective hinge points of the first part and the second part.

Especially, the calculating the rotation angle between the first part and the second part based on the independent surround-view images of the first part and the second part includes: detecting and matching feature points in n pairs of independent surround-view images of the first part and the second part; and calculating n rotation and translation matrices between the first part and the second part based on the coordinates of the matched feature points, and calculating the corresponding n rotation angles between the first part and the second part; wherein each pair of the independent surround-view images of the first part and the second part corresponds to one rotation angle, and the n angles are different from each other, where n is an integer greater than or equal to 2.

Especially, the calculating the corresponding translation vector between the first part and the second part includes: calculating the corresponding n translation vectors between the first part and the second part according to the coordinates of the matched feature points in the n pairs of independent surround-view images of the first part and the second part and the corresponding n rotation angles.

Especially, the calculating the coordinates of the respective hinge points of the first part and the second part includes: based on a premise that the feature points in the independent surround-view images of the first part and the second part always rotate around their hinge points, calculating the coordinates of the respective hinge points of the first part and the second part based on the n rotation angles and the n translation vectors; wherein, the coordinates of the hinge points meet a requirement that the feature points in the independent surround-view image of the first part are closest to the coordinates of the corresponding matched feature points in the independent surround-view image of the second part after rotation and translation.

Especially, the method for calculating the coordinates of the hinge points further includes: grouping then pairs of independent surround-view images of the first part and the second part into m groups through grouping every two pairs of the n pairs of independent surround-view images of the first part and the second part into one group, where m is an integer greater than or equal to 1, and m is less than n; based on a premise that the feature points in the independent surround-view images of the first part and the second part always rotate around their hinge points, calculating m groups of coordinates of the hinge points in total based on m groups of rotation angles and translation vectors between the first part and the second part; wherein, the coordinates of each group of the hinge points meet a requirement that the feature points in the independent surround-view image of the first part of this group are closest to the coordinates of the corresponding matched feature points in the independent surround-view image of the second part after rotation and translation; ranking a calculation result of them groups of coordinates of the hinge points, and determining a median value in a ranking result as the coordinates of the respective hinge points of the first part and the second part.

Especially, a difference value of the rotation angle between the first part and the second part in each of the m groups of independent surround-view images is greater than a preset value.

Especially, the obtaining the independent surround-view images of the first part and the second part of the vehicle includes: performing distortion correction on the raw images; projecting corrected images into a geodetic coordinate system to generate airviews; detecting and matching feature points of the airviews of the first part and feature points of the airviews of the second part respectively, and then performing fixed stitching to obtain respective fixed stitched images of the first part and the second part; cropping the fixed stitched images to obtain the respective independent surround-view images of the first part and the second part.

The present application further provides an apparatus for vehicle hinge point calibration, and the apparatus includes: a raw image acquisition unit configured to acquire raw images of external environments of a first part and a second part of a vehicle hinged with each other; a fixed stitching unit coupled to the raw image acquisition unit and configured to stitch the raw images of the first part and the second part into the respective independent surround-view images; and a hinge point calibration unit coupled to the fixed stitching unit and configured to calculate a rotation angle and a corresponding translation vector between the first part and the second part based at least on the independent surround-view images of the first part and the second part, so as to calculate coordinates of respective hinge points of the first part and the second part.

Especially, the hinge point calibration unit further includes: an independent surround-view image acquisition module configured to acquire n pairs of independent surround-view images of the first part and the second part respectively, where n is an integer greater than or equal to 2; a feature point detection and matching module coupled to the independent surround-view image acquisition module and configured to detect and match feature points in the n pairs of independent surround-view images of the first part and the second part; a rotation angle acquisition module, coupled to the feature point detection and matching module, and configured to calculate n rotation and translation matrices between the first part and the second part based on coordinates of matched feature points and calculate corresponding n rotation angles between the first part and the second part, wherein each pair of the independent surround-view images of the first part and the second part corresponds to one rotation angle, and the n angles are different from each other.

Especially, the hinge point calibration unit further includes: a translation vector acquisition module, coupled to the rotation angle acquisition module, and configured to calculate corresponding n translation vectors between the first part and the second part according to the coordinates of the matched feature points in the n pairs of independent surround-view images of the first part and the second part and the corresponding n rotation angles.

Especially, the hinge point calibration unit further includes: a hinge point coordinate acquisition module, coupled to the translation vector acquisition module, and configured to calculate the coordinates of the respective hinge points of the first part and the second part according to the n rotation angles and the n translation vectors based on a premise that the feature points in the independent surround-view images of the first part and the second part always rotate around their hinge points; wherein, the coordinates of the hinge points meet a requirement that the feature points in the independent surround-view image of the first part are closest to the coordinates of the corresponding matched feature points in the independent surround-view image of the second part after rotation and translation.

Especially, the hinge point coordinate acquisition module is further configured to: group the n pairs of independent surround-view images of the first part and the second part into m groups through grouping every two pairs of the n pairs of independent surround-view images of the first part and the second part into one group, where m is an integer greater than or equal to 1, and m is less than n; based on a premise that the feature points in the independent surround-view images of the first part and the second part always rotate around their hinge points, calculate m groups of coordinates of the hinge points based on m groups of rotation angles and translation vectors between the first part and the second part; wherein, the coordinates of each group of the hinge points meet a requirement that the feature points in the independent surround-view image of the first part of this group are closest to the coordinates of the corresponding matched feature points in the independent surround-view image of the second part after rotation and translation; rank a calculation result of the m groups of coordinates of the hinge points, and determine a median value in a ranking result as the coordinates of the respective hinge points of the first part and the second part; wherein, a difference value of the rotation angle between the first part and the second part in one group of independent surround-view images is greater than a preset value.

Especially, the fixed stitching unit further includes: an image distortion correction module coupled to the raw image acquisition unit and configured to perform distortion correction on the raw images; a perspective transformation module coupled to the image distortion correction module and configured to project corrected images into a geodetic coordinate system to generate corresponding airviews; a fixed stitching module, coupled to the perspective transformation module, and configured to perform fixed stitching on the airviews of the first part and the second part respectively to obtain fixed stitched images of the first part and the second part; an image cropping module, coupled to the fixed stitching module, and configured to crop the fixed stitched images to obtain the independent surround-view images of the first part and the second part.

The present application further provides a computer device including a memory and a processor, the memory stores a computer program thereon, the processor implements steps of any of the above-mentioned methods when the processor executes the computer program.

The present application further provides a computer-readable storage medium on which a computer program is stored thereon, the computer program implements steps of any of the above-mentioned methods when the computer program is executed by a processor.

For a vehicle that includes multiple different parts that are hinged with each other, the hinge point is an important dynamic parameter, accurately measuring the coordinate of the hinge point is beneficial to the development of related applications of the vehicle active safety system, thereby a more accurate panoramic view of the vehicle can be obtained.

DESCRIPTION OF THE DRAWINGS

Preferred embodiments of the present application will be described in further detail below with reference to the accompanying drawings, in which.

DETAILED EMBODIMENTS

Figure 1:
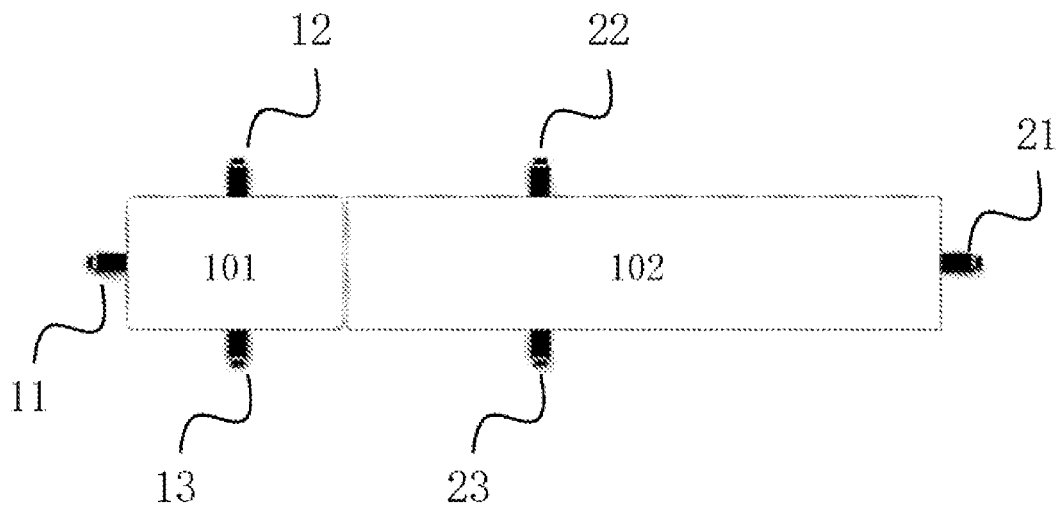
FIG. 1 is a schematic structural diagram of a vehicle according to an embodiment of the present application.

In order to make the purpose, technical solutions and advantages of the embodiments of the present application more clear, the technical solutions in the embodiments of the present application will be described clearly and completely below with reference to the accompanying drawings in the embodiments of the present application. Obviously, the described embodiments are partial embodiments, but not all embodiments, of the present application. Based on the embodiments in the present application, all other embodiments obtained by those of ordinary skill in the art without paying creative efforts shall fall within the protection scope of the present application.

In the following detailed description, reference may be made to the accompanying drawings, which are considered as a part of the present application to illustrate specific embodiments of the application. In the accompanying drawings, like reference numerals describe substantially similar components in different figures. The specific embodiments of the present application are described in sufficient detail below to enable those of ordinary skill provided with relevant knowledge and technology in the art to implement the technical solutions of the present application. It should be understood that other embodiments may also be utilized, or structure, logic or electrical property of the embodiments of the present application may be changed.

The present application provides a method for vehicle hinge point calibration, here the vehicle is composed of at least two parts that are hinged together. In some embodiments, the vehicle is composed of multiple parts that are hinged in pairs, for example, a train, a subway, etc. is also applied to the method described in the present application.

The following takes a vehicle consisting of two parts hinged to each other as an example to briefly describe the vehicle structure to which this method is applied. FIG. 1 is a schematic structural diagram of a vehicle according to an embodiment of the present application. In this embodiment, it is assumed that a left side in this figure is a forward direction of the vehicle. The vehicle as shown in FIG. 1 includes a first part 101 and a second part 102, and the two parts are connected by a hinge. Here, under a hinged state, a hinge point of the first part 101 coincides with a hinge point of the second part 102. A wide-angle camera 11, a wide-angle camera 12 and a wide-angle camera 13 are disposed on a front, right and left sides of the first part 101, respectively. A wide-angle camera 21, a wide-angle camera 22 and a wide-angle camera 23 are provided at a rear, right and left sides of the second portion 102, respectively. In this embodiment, the camera may be a wide-angle camera of 180° or other angles, and the arrangement of the cameras is only an example. In some embodiments, the positions and number of the cameras may be further set in other ways.

In some embodiments, the vehicle may further include a camera synchronization module to realize data synchronization between the cameras.

For a vehicle that includes a plurality of mutually hinged parts, the hinge point has an irreplaceable special function relative to other feature points. Because no matter how a motion state of two hinged parts of the vehicle changes, in practice the respective hinge points of the two parts of the vehicle should always coincide. Therefore, once coordinates of the respective hinge points of the mutually hinged parts are calculated, a more realistic and stable stitching effect can be obtained in a subsequent image stitching process based on the known coincidence relationship.

Figure 2:
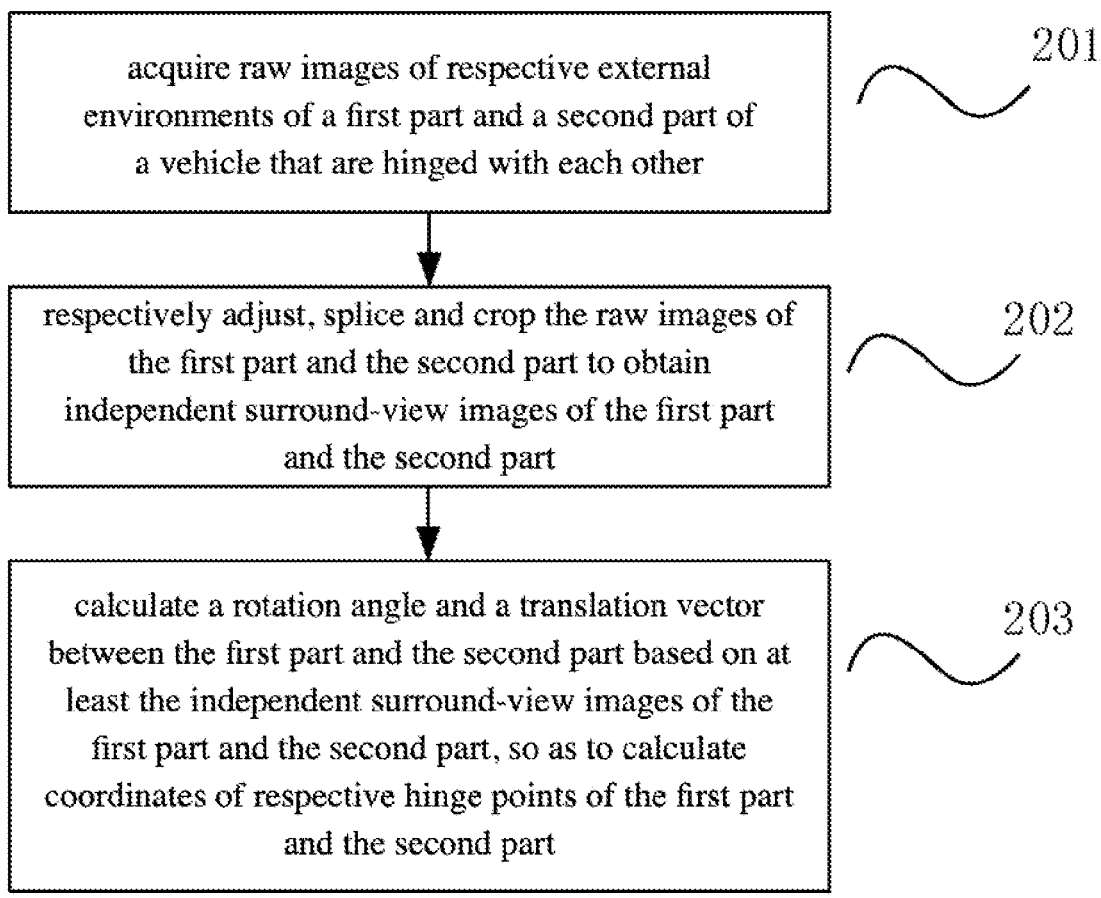
FIG. 2 is an overall schematic flowchart of a method for vehicle hinge point calibration according to an embodiment of the present application.

The flow of the method described in the present application will be described in detail below. FIG. 2 is an overall schematic flowchart of a method for vehicle hinge point calibration according to an embodiment of the present application. In some embodiments, as shown in FIG. 2, the method for vehicle hinge point calibration described in the present application includes the following.

At a step 201, acquire raw images of respective external environments of a first part and a second part of a vehicle that are hinged with each other.

Among them, the raw images are images directly obtained by a camera, and may be raw images including the external environments of the first part and the second part, of course, these raw images may also include partial vision of the vehicle itself. In some embodiments, a wide-angle camera may be provided outside the vehicle to achieve raw image acquisition. In some embodiments, the wide-angle camera may be a wide-angle camera of 180° or other degrees. In some embodiments, in order to obtain better image performance, the shooting angle of each raw image may be enlarged as much as possible.

At a step 202, respectively adjust, splice and crop the raw images of the first part and the second part to obtain independent surround-view images of the first part and the second part.

Because the raw image data of the first part and the second part obtained in the step 201 is unprocessed, and the images captured by adjacent cameras have overlapping areas. Therefore, it is necessary to convert the raw images (the specific conversion process will be described in detail later), and then perform fixed stitching of multiple images having the same part (the first part or the second part) to obtain the complete independent surround-view image of this part. Here, the respective independent surround-view image of the first part or the second part is a complete top view of the external environment of this part excluding the hinged side. In some embodiments, the vehicle such as a train, a subway and the like may be composed of multiple mutually hinged parts.

At a step 203, calculate a rotation angle and a translation vector between the first part and the second part based on at least the independent surround-view images of the first part and the second part, so as to calculate coordinates of respective hinge points of the first part and the second part.

In this embodiment, through acquiring the coordinates of the matched feature points in the independent surround-view images of the first part and the second part, the rotation angle between the first part and the second part of the vehicle can be obtained by calculation. Compared with previous methods in which physical measurement must be performed through an angle sensor, the method in this embodiment is simpler and faster, and avoids possible interference in practical application scenarios. After the rotation angle is obtained, the displacement between the matched feature points in the independent surround-view images of the first part and the second part of the vehicle can be further calculated. After these two key data is acquired, it is possible to further calculate the coordinates of the respective hinge points of the first part and the second part.

Figure 3:
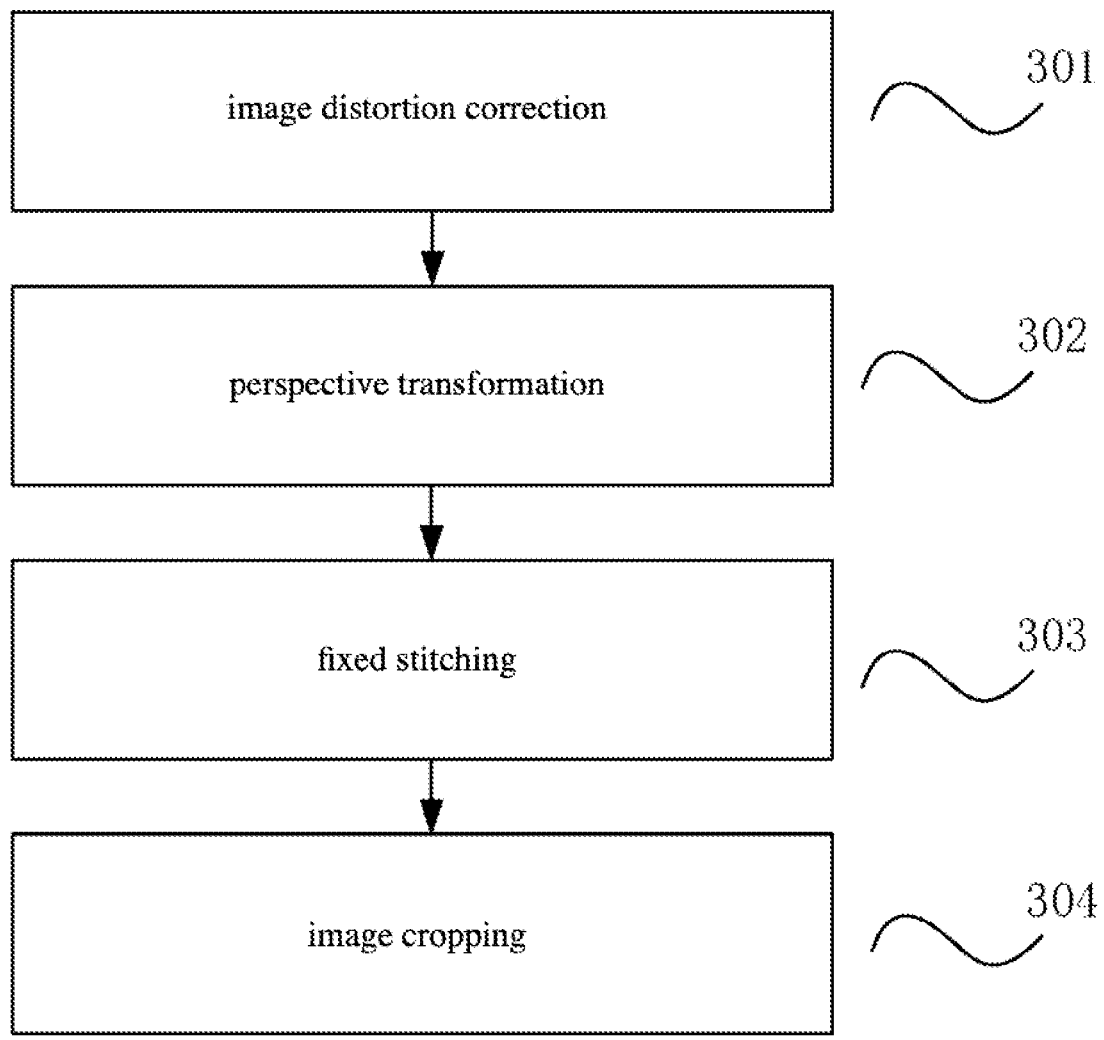
FIG. 3 is a schematic flowchart of a method for fixedly stitching raw images of various hinge parts of a vehicle according to an embodiment of the present application.

FIG. 3 is a schematic flowchart of a method for fixedly stitching raw images of various hinge parts of a vehicle according to an embodiment of the present application, which is a further description for the step 202 in the foregoing method. The method includes the following.

At a step 301, perform distortion correction on the raw images.

In some embodiments, the raw images captured by the wide-angle cameras include features in a form of perspective distortion, the effect of which will cause the images to be distorted, and cannot correctly reflect distance relationship of objects in the images. In order to eliminate this kind of distortion, it is necessary to perform distortion correction processing on the raw images collected by the wide-angle cameras. In some embodiments, camera parameters and distortion correction parameters calibrated by the wide-angle cameras may be used to perform correction processing on the raw images to obtain corrected images corresponding to the raw images. Among them, the camera parameters and the distortion correction parameters may be determined according to an internal structure and an established distortion model of the wide-angle cameras.

At a step 302, perform perspective transformation on the distortion-corrected images.

In a practical application, what a user needs to see is a vehicle operating state diagram from a top-down perspective, so it is also necessary to perform perspective transformation on the distortion-corrected image. In some embodiments, the images obtained by different cameras are projected into a geodetic coordinate system to form airviews (which may be obtained through performing perspective transformation by selecting specified feature points of a calibration object), and a mapping relationship between the corrected images and the airviews is generated to acquire the airviews corresponding to the corrected images.

At a step 303, perform fixed stitching on the airviews.

For the parts of the vehicle that is hinged with each other, the airview of each part from all directions may be stitched. Due to the characteristics of the wide-angle cameras, there is a partial overlapping area between the airviews captured by adjacent cameras for each part, so the overlapping area needs to be corrected to form fixed stitched images through stitching.

In some embodiments, several marker points may be manually selected for matching to realize the fixed stitching. Of course, other known methods may also be used for matching.

At a step 304, perform image cropping on the fixed stitched images.

In the foregoing steps, the fixed stitched images of various parts of the vehicle are obtained, however such fixed stitched images may also include unnecessary parts. In some embodiments, for the fixed stitched images of the various parts, the region of interest may be cropped according to requirements so that the size of the images fits within a display range of a screen, so as to be displayed on the screen, and finally the independent surround-view images of the first part and the second part are obtained.

Figure 4:
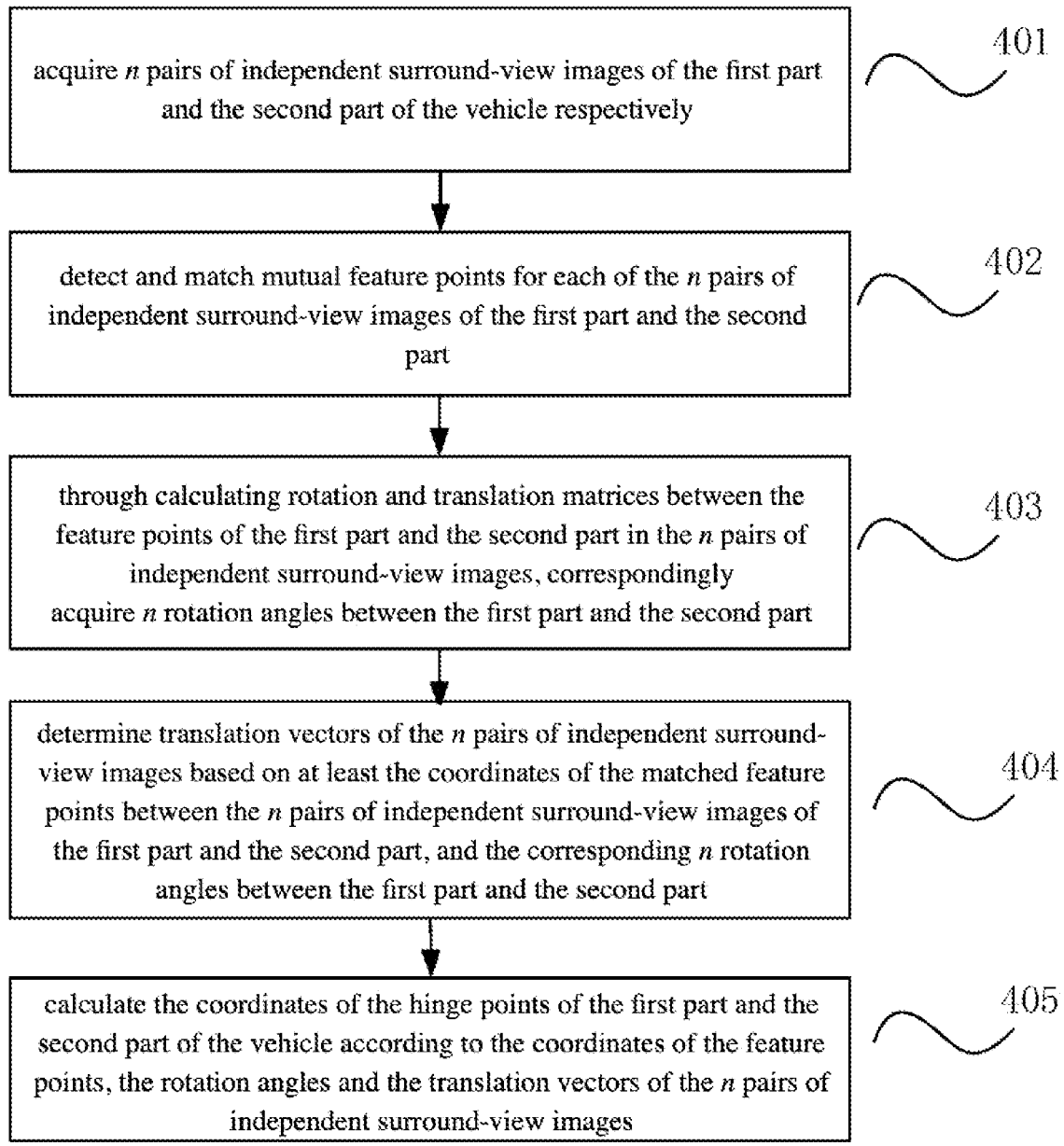
FIG. 4 is a schematic flowchart of a method for calculating coordinates of hinge points of various parts of a vehicle according to an embodiment of the present application.

FIG. 4 is a schematic flowchart of a method for calculating coordinates of hinge points of various parts of a vehicle according to an embodiment of the present application, which is a further description of the step 203 in FIG. 2. In some embodiments, as shown in FIG. 4, the method for calculating coordinates of hinge points of various parts of a vehicle includes the following.

At a step 401, acquire n pairs of independent surround-view images of the first part and the second part of the vehicle respectively, the first part and the second part of the vehicle in each pair of images form an angle of θ, and then pairs of images correspond to n different angles. Here, n may be a positive integer greater than or equal to 2.

At a step 402, detect and match mutual feature points for each of the n pairs of independent surround-view images of the first part and the second part.

In some embodiments, the feature point refers to a point in an image that has distinct characteristics and can effectively reflect essential characteristics of an image and can identify a target object in an image. The feature points of an image consist of two sections: keypoints and descriptors. The key point refers to position, orientation and scale information of the feature point in an image. The descriptor is usually a vector, which describes information of pixels around the key point according to an artificial design. Usually, similar-looking descriptors have corresponding similar descriptors. Therefore, as long as the descriptors of two feature points have a close distance in the vector space when matching, the two feature points may be considered to be the same feature point.

Specifically, regarding the acquisition of the key points of the independent surround-view images of the two hinged parts, the descriptors of the feature points may be calculated according to the positions of the key points, matching is performed on the feature points of the surround-view images of the two hinged parts of the vehicle according to the descriptors of the feature points to acquire matched feature point pairs of the surround-view images of the two hinged parts of the vehicle. In one embodiment, a brute force matching algorithm may be used, which compares the descriptors of the feature points of the independent surround-view images of the two hinged parts one by one in the vector space, and selects one pair provided with a smaller distance as the matched point pair.

In some embodiments, the feature point detection method may include: orb, surf, or sift algorithms, etc.

In some embodiments, the feature point matching algorithm may include a brute force matching algorithm or a nearest neighbor matching algorithm, or the like.

In some embodiments, a feature point filtering method is further included, and the filtering method may include RANSAC or GMS algorithm or the like.

At a step 403, through calculating rotation and translation matrices between the feature points of the first part and the second part in the n pairs of independent surround-view images, correspondingly acquire n rotation angles between the first part and the second part.

In some embodiments, a RANSAC (Random Sampling Consensus) algorithm or an LMedS (Least Median Square) method may be used to select the feature matching point pairs of the independent surround-view images of the two hinged parts. The RANSAC algorithm is taken as an example for illustration. Specifically, several pairs of matching points are extracted from the acquired matching point pairs to calculate the rotation and translation matrices for transformation, and these pairs of points are recorded as "interior points". Non-interior points are continued to be found in the matching point pairs, and they are added to the interior points if these matching point pairs fit the matrices. When the number of point pairs in the interior points is greater than a set threshold, the rotation and translation matrices may be determined based on these data. According to the above method, random sampling is performed k times (k is a positive integer greater than 0), the largest set of the interior points is selected, and mismatched point pairs such as non-interior points etc. are filtered out. Only after the mismatched points are filtered out, the rotation and translation matrices with respect to a specific angle can be obtained by using the correct matching point pairs in the interior points. According to the rotation and translation matrices of n angles, n rotation angles $\theta_1, \ldots, \theta_n$ between the first part and the second part are acquired.

In the method involved in the present application, the acquisition of the angle is obtained by calculation. Different from the methods obtained by physical measurement in the prior art, the result obtained through the method involved in the present application is more accurate, and the operation difficulty in the process of obtaining the angles is lower through the method involved in the present application. At the same time, the use of sensors is reduced, the cost is lower, and it has wider applicability. Moreover, interference factors in the environment can be avoided.

At a step 404, determine translation vectors of the n pairs of independent surround-view images based on at least the coordinates of the matched feature points between the n pairs of independent surround-view images of the first part and the second part, and the corresponding n rotation angles between the first part and the second part.

According to an embodiment, the coordinates of the hinge point of the first part 101 of the vehicle may be set as $(a_x, a_y)$, the coordinates of the hinge point of the second part 102 of the vehicle connected with the first part 101 may be set as $(b_x, b_y)$, and the coordinates of the matched feature points in the surround-view images of the first part 101 and the second part may be set as $(x_0, y_0)$ and $(x_1, y_1)$ respectively, and $\theta$ is the relative rotation angle of the first part and the second part, then $$\begin{bmatrix} \cos\theta & -\sin\theta & 0 \\ \sin\theta & \cos\theta & 0 \\ 0 & 0 & 0 \end{bmatrix} \begin{bmatrix} x_0 - a_x \\ y_0 - a_y \\ 1 \end{bmatrix} + \begin{bmatrix} b_x \\ b_y \\ 1 \end{bmatrix} = \begin{bmatrix} x_1 \\ y_1 \\ 1 \end{bmatrix}. \quad (1)$$

The formula (1) can be disassembled to obtain the formula (2)

$$\begin{cases} \cos\theta * x_0 - \sin\theta * y_0 - a_x * \cos\theta + a_y * \sin\theta + b_x = x_1 \\ \sin\theta * x_0 + \cos\theta * y_0 - a_x * \sin\theta - a_y * \cos\theta + b_y = y_1 \end{cases} \quad (2)$$

The translation vector includes translation parameters for the features of the independent surround-view images of the two hinged parts to translate from one image to another. For example, the translation parameters for the feature points in the matching point pairs to translate from the independent surround-view image of the first part 101 to the independent surround-view image of the second part 102. Therefore, for one pair of matching points, assuming that the coordinate of the feature point of the independent surround-view image of the first part 101 of the vehicle is the origin, the coordinate of the corresponding matching point of the independent surround-view image of the second part 102 of the vehicle is numerically equal to the the translation vector of the two images.

Namely, when the feature point $(x_0, y_0)$ of the surround-view image of the first part is set as (0,0), then the coordinate $(x_1, y_1)$ of the feature point matched in the surround-view image of the second part is the translation vector (dx, dy) from the surround-view image of the first part to the surround-view image of the second part, that is, $$\begin{cases} -a_x * \cos\theta + a_y * \sin\theta + b_x = dx \\ -a_x * \sin\theta - a_y * \cos\theta + b_y = dy \end{cases} \quad (3)$$

At a step 405, calculate the coordinates of the hinge points of the first part and the second part of the vehicle according to the coordinates of the feature points, the rotation angles and the translation vectors of the n pairs of independent surround-view images. The calculation here is based on a premise that the points in the independent surround-view images of the first part and the second part of the vehicle are all rotated around their respective hinge points (as a center of a circle) when a moving direction of the vehicle changes.

Regarding each rotation angle $\theta$, there is one corresponding translation vector. Using these n angles and n translation vectors into the following equation to calculate $(a_x, a_y, b_x, b_y)$:

$$\arg\min_{(a_x, a_y, b_x, b_y)} \left\| \begin{bmatrix} -\cos\theta_1 & \sin\theta_1 & 1 & 0 \\ \sin\theta_1 & -\cos\theta_1 & 0 & 1 \\ \vdots & \vdots & \vdots & \vdots \\ -\cos\theta_n & \sin\theta_n & 1 & 0 \\ \sin\theta_n & -\cos\theta_n & 0 & 1 \end{bmatrix} * \begin{bmatrix} a_x \\ a_y \\ b_x \\ b_y \end{bmatrix} - \begin{bmatrix} dx_1 \\ dy_1 \\ \vdots \\ dx_n \\ dy_n \end{bmatrix} \right\|. \quad (4)$$

In general, since multiple pairs of independent surround-view images of the first part and the second part need to be taken for test and calculation, so the value of n will be much larger than 2, so an overdetermined equation system such as formula (4) is formed. The overdetermined equation system may be solved by using the least square method, such that the coordinates of the hinge points of the first part and the second part which are closest to the actual values can be obtained by calculation.

Considering that if there are several abnormal values in the above n angles, then there will be a greater impact on the calculation result of the coordinates of the hinged points, so a further method may be used to eliminate the interference caused by the abnormal values.

According to an embodiment, it is assumed that two sets of angles $(\theta_i, \theta_j)$ and corresponding translation vectors are selected from n angles, in order to make the obtained result more robust, the selected angles should satisfy $|\theta_i - \theta_j| > \sigma$ (where $\sigma$ is a preset angle which may be set according to actual needs, for example a value as large as possible may be selected to meet the accuracy of the calculation, i and j are integers greater than 0 and less than or equal to n, and i is not equal to j), that is, the angle difference between any two rotation angles is greater than a preset value. Therefore, regarding any set of angles $(\theta_i, \theta_j)$ and translation parameters $(dx_i, dy_i, dx_j, dy_j)$, the following is met:

$$\arg\min_{(a_x, a_y, b_x, b_y)} \left\| \begin{bmatrix} -\cos\theta_i & \sin\theta_i & 1 & 0 \\ \sin\theta_i & -\cos\theta_i & 0 & 1 \\ -\cos\theta_j & \sin\theta_j & 1 & 0 \\ \sin\theta_j & -\cos\theta_j & 0 & 1 \end{bmatrix} * \begin{bmatrix} a_x \\ a_y \\ b_x \\ b_y \end{bmatrix} - \begin{bmatrix} dx_i \\ dy_i \\ dx_j \\ dy_j \end{bmatrix} \right\|. \quad (5)$$

A set of solutions $(a_x, a_y, b_x, b_y)$ may be obtained by solving, then m sets of angles $(\theta_i, \theta_j)$ and m sets of translation parameters $(dx_i, dy_i, dx_j, dy_j)$ may be obtained by m sets of solutions:

$$\begin{bmatrix} (a_x, a_y, b_x, b_y)_1 \\ (a_x, a_y, b_x, b_y)_2 \\ \vdots \\ (a_x, a_y, b_x, b_y)_m \end{bmatrix}. \quad (6)$$

The m sets of solutions are ranked, and the ranking result shows a Gaussian distribution, and a median value of the ranked result is taken as the coordinate of the hinge point. That is, the calculation results of the coordinates of the corresponding hinge points are obtained according to the coordinates, the rotation angles and the translation vectors of the feature matching point pairs of the surround-view images of the two hinged parts of the vehicle, and the calculation results of the coordinates of the hinge points are ranked, and the median value is taken as the coordinate of the hinge point. In this embodiment, n may be an integer greater than or equal to 2, m may be an integer greater than or equal to 1, and m is less than n. Through the above method, the influence of the abnormal values of the rotation angles on the calculation result can be effectively reduced.

The method described in the present application obtains the coordinate of the final hinge point through matching and calculating the feature points of the independent surround-view images of the two hinged parts. Compared with the traditional physical measurement technologies, the coordinate of the hinge point obtained by this method is more accurate. For the vehicle provided with a hinged structure, this method is provided with more adaptability because there is no need to install a physical measurement equipment. This method is simple and reliable in operation, and can realize the calibration of the hinge point without the aid of other tools, thereby saving labor cost and material resources.

Figure 5:
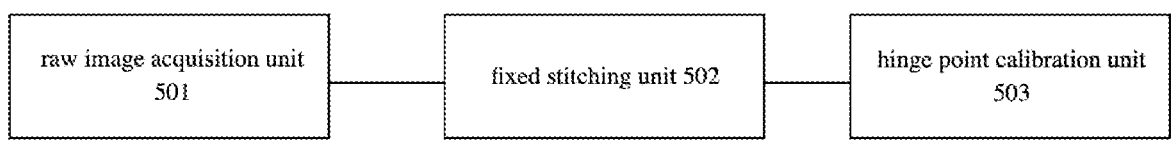
FIG. 5 is a schematic structural diagram of an apparatus for vehicle hinge point calibration according to an embodiment of the present application.

The present application further includes an apparatus for vehicle hinge point calibration, and FIG. 5 is a schematic structural diagram of the apparatus for vehicle hinge point calibration according to an embodiment of the present application. As shown in the figure, the structure of the apparatus for hinge point calibration may include the following.

A raw image acquisition unit 501. It is configured to acquire raw images of external environments of two hinged parts of a vehicle. In some embodiments, the raw image acquisition unit 501 may include a wide-angle camera disposed on a non-hinged side of the two hinged parts of the vehicle.

An image stitching unit 502. It is coupled to the raw image acquisition unit 501 and configured to stitch raw image data of the two parts into independent surround-view images of the parts.

A hinge point calibration unit 503. It is coupled to the image stitching unit 502 and configured to obtain parameters of the independent surround-view images and calculate coordinates of hinge points. In some embodiments, the parameters of the independent surround-view images may include coordinates of feature points matched in the independent surround-view images of the first part and the second part, rotation angles and translations between the first part and the second part.

Figure 6:
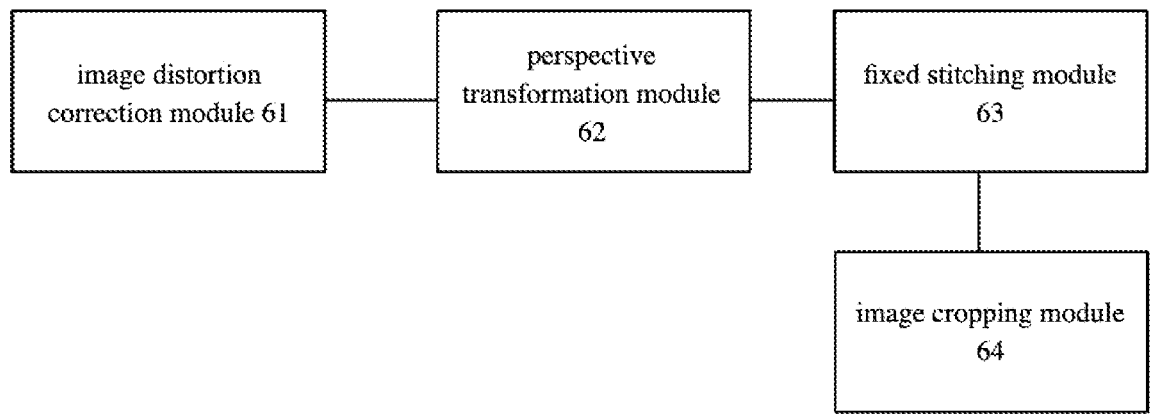
FIG. 6 is a schematic structural diagram of a fixed stitching unit of the apparatus for vehicle hinge point calibration according to an embodiment of the present application.

FIG. 6 is a schematic structural diagram of a fixed splicing unit of the apparatus for vehicle hinge point calibration according to an embodiment of the present application. As shown in FIG. 6, the fixed splicing unit may include the following.

An image distortion correction module 61. It is coupled to the raw image acquisition module 501 and configured to perform distortion correction on the raw images to obtain corrected images corresponding to the raw images.

A perspective transformation module 62. It is coupled to the image distortion correction module 61 and configured to project the corrected images into a geodetic coordinate system to generate corresponding airviews.

A fixed stitching module 63. It is coupled to the perspective transformation module 62 and configured to perform fixed stitching for the airviews of the first part and the second part respectively to obtain a fixed stitched image of the first part and a fixed stitched image of the second part respectively.

An image cropping module 64. It is coupled to the fixed stitching module 63 and configured to crop the fixed stitched image of the first part and the fixed stitched image of the second part to obtain independent surround-view images of the first part and the second part. Of course, if the clipping is not required, the image cropping module 64 may not be included.

Here, the specific method for obtaining the independent surround-view images has been disclosed in the foregoing content, which will not be repeated here again.

Figure 7:
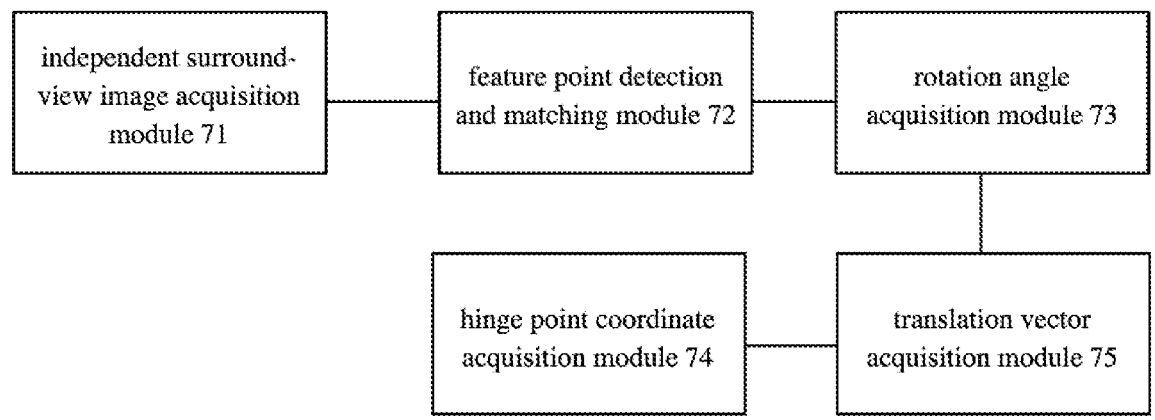
FIG. 7 is a schematic structural diagram of a hinge point calibration unit of the apparatus for vehicle hinge point calibration according to an embodiment of the present application.

FIG. 7 is a schematic structural diagram of a hinge point calibration unit of the apparatus for vehicle hinge point calibration according to an embodiment of the present application. As shown in FIG. 7, the hinge point calibration unit 701 includes the following.

An independent surround-view image acquisition module 71. It is configured to acquire n pairs of independent surround-view images of the mutually hinged first and second parts of the vehicle respectively.

A feature point detection and matching module 72. It is coupled to the independent surround-view image acquisition module and configured to detect and match feature points in each pair of the independent surround-view images of the first part and the second parts.

A rotation angle acquisition module 73. It is coupled to the feature point detection and matching module, and is configured to obtain n rotation and translation matrices between the feature points of the first part and the second part in each pair of independent surround-view images based on the coordinates of the matched feature points, and correspondingly obtain n rotation angles between the first part and the second part in each pair of the independent surround-view images.

A translation vector acquisition module 74. It is coupled to the rotation angle acquisition module, and is configured to determine corresponding n translation vectors of each pair of the independent surround-view images according to the coordinates of the feature points of each pair of the independent surround-view images of the first part and the second part, and the n rotation angles.

A hinge point coordinate acquisition module 75. It is coupled to the translation vector acquisition module, and is configured to calculate coordinates of the hinge points of the first part and the second part of the vehicle according to the coordinates, the n rotation angles and the corresponding n translation vectors of the matched feature points of the n pairs of the independent surround-view images.

Here, the specific method for obtaining the coordinates of the hinge points has been disclosed in the foregoing content, which will not be repeated here again.

In some embodiments, the hinge point coordinate acquisition module 75 may be further configured to: firstly group two pairs of the n pairs of independent surround-view images into one group, then acquire a calculation result of a coordinate of the corresponding hinge point according to the coordinates, the rotation angle and the translation vector of the feature points of each group of the independent surround-view images, next rank the coordinate calculation result of each group of the hinge points after the calculation results of the m groups of the independent surround-view images are acquired, and take a median value of the ranking result as the coordinate of the hinge point. Here, the specific method has been disclosed in the foregoing content, which will not be repeated here again.

In some embodiments, the angle difference between the rotation angles of the first part and the second part in one group of independent surround-view image may be greater than a preset angle, and this angle may be as large as possible to meet the accuracy of the calculation.

The above-mentioned apparatus for vehicle hinge point calibration obtains the final hinge point coordinate by matching and calculating the feature points of the independent surround-view images of the two hinged parts. Compared with the traditional physical measurement technologies, the hinge point coordinate obtained by this method is more accurate. For the vehicle provided with a hinged structure, this method has wider adaptability. This method is simple and reliable in operation, and can realize the calibration of the hinge point without the aid of other tools, thereby saving labor cost and material resources.

Figure 8:
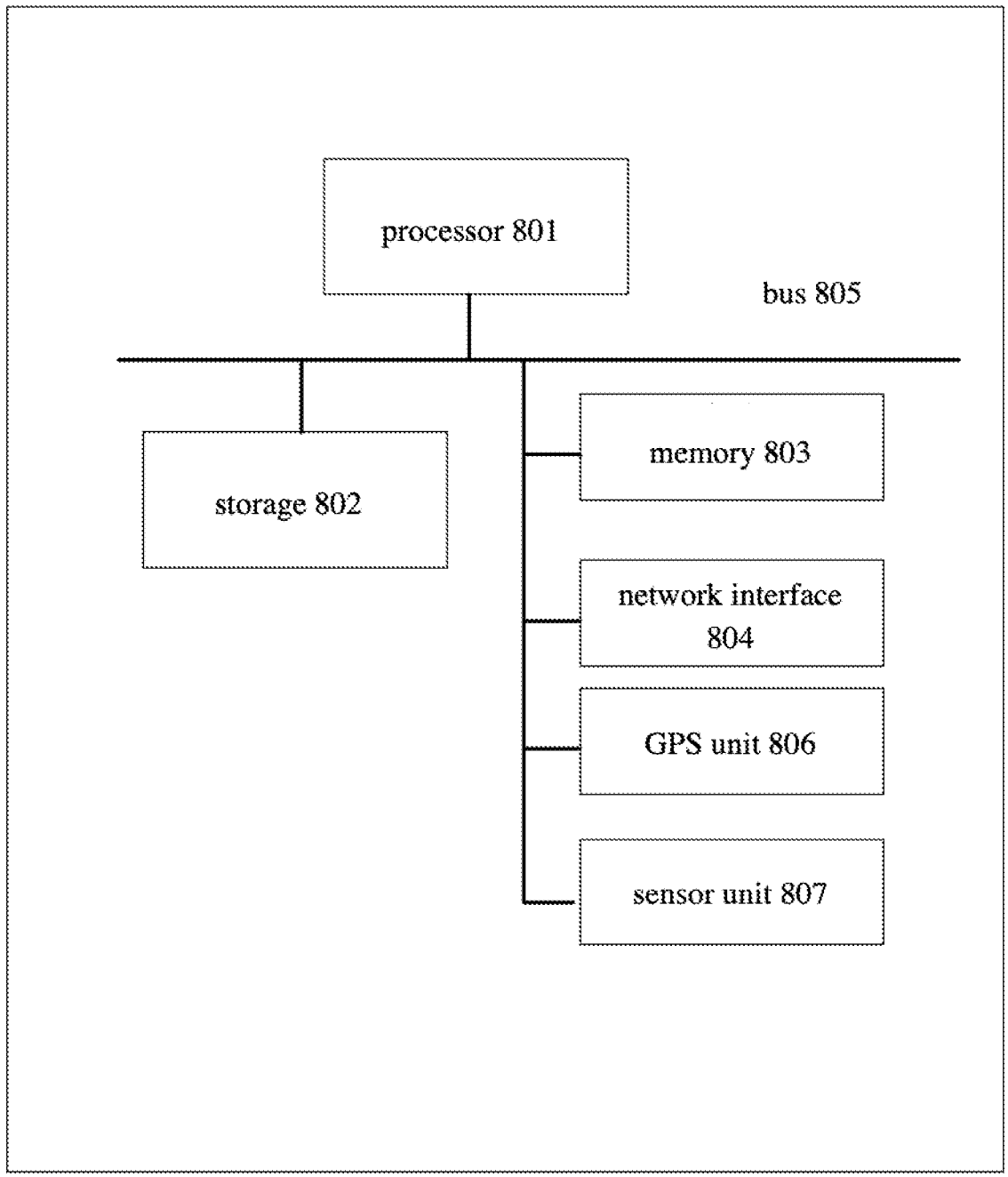
FIG. 8 is a schematic structural diagram of a computer device according to an embodiment of the present application.

The present application further includes a computer device, which may be an apparatus for vehicle hinge point calibration or a vehicle master control. FIG. 8 is a schematic structural diagram of a computer device according to an embodiment of the present application. This device includes a processor 801 and a storage 802 configured to store a computer program that can be executed on the processor 801. Among them, the processor 801 is configured to execute steps of the method provided by any embodiment of the present application when executing the computer program. Here, the processor 801 and the storage 802 do not mean that their corresponding numbers are equal to one, but may be one or more. The intelligent driving device may further include a memory 803, a network interface 804, and a system bus 805 connecting the memory 803, the network interface 804, the processor 801 and the storage 802. The computer program is stored in the memory, and the processor, when executing the computer program, implements the above-mentioned method for vehicle hinge point calibration. The processor 801 is configured to support the operation of the entire computer device. The memory 803 may be used to provide an environment for the execution of the computer program in the storage 802. The network interface 804 may be configured to perform network communication and receive or send data for an external server device, a terminal devices, etc. Here, the computer device may further include a GPS unit 806 configured to obtain location information of the computer device. The sensor unit 807 may include a wide-angle camera configured to acquire multiple images and cooperate with the processor 801 and the storage 802 to acquire a depth image. Here, the processor 801 is configured to execute the method as shown in FIG. 1 based on the information obtained by the various units to obtain the coordinate of the hinge point.

The present application further includes a computer-readable storage medium on which a computer program is stored, and the computer program, when executed by a processor, implements the above-mentioned method for vehicle hinge point calibration. Here, the steps of the specific method are not repeated here again.

Those of ordinary skill in the art can understand that all or part of the processes in the methods of the above embodiments may be implemented by instructing relevant hardware through a computer program, and the computer program may be stored in a non-volatile computer-readable storage medium, and the computer program, when executed, may include the processes of the above-mentioned method embodiments. Here, any reference to the memory, the storage, the database or other medium used in the various embodiments provided in the present application may include a non-volatile and/or volatile memory. The non-volatile memory may include a ROM (Read Only Memory), PROM (Programmable ROM), EPROM (Electrically Programmable ROM), EEPROM (Electrically Erasable Programmable ROM), or flash memory. The volatile memory may include a RAM (Random Access Memory) or external cache memory. By way of illustration but not limitation, the RAM is available in various forms such as SRAM (Static RAM), DRAM (Dynamic RAM), SDRAM (Synchronous DRAM), DDRSDRAM (Double Data Rate SDRAM), ESDRAM (Enhanced SDRAM), enhanced SDRAM (Synchlink DRAM), memory RDRAM (Rambus direct RAM), DRDRAM (Direct Rambus dynamic RAM), and RDRAM (Rambus dynamic RAM) etc.

The foregoing embodiments are only for the purpose of illustrating the present application, rather than limiting the present application. Those of ordinary skill in the art can also make various changes and modifications without departing from the scope of the present application. Therefore, all equivalent technical solutions should also belong to the scope disclosed in the present application.

What is claimed is:

1. A method for vehicle hinge point calibration, comprising:

acquiring raw images of external environments of a first part and a second part of a vehicle hinged with each other;

adjusting, stitching and cropping the raw images to obtain respective independent surround-view images of the first part and the second part; and calculating a rotation angle and a corresponding translation vector between the first part and the second part based at least on the independent surround-view images of the first part and the second part, thereby calculating coordinates of respective hinge points of the first part and the second part;

wherein the calculating the rotation angle between the first part and the second part based on the independent surround-view images of the first part and the second part comprises:

detecting and matching feature points in n pairs of independent surround-view images of the first part and the second part; and calculating n rotation and translation matrices between the first part and the second part based on the coordinates of the matched feature points, and calculating the corresponding n rotation angles between the first part and the second part;

each pair of the independent surround-view images of the first part and the second part corresponds to one rotation angle, and the n angles are different from each other, where n is an integer greater than or equal to 2;

wherein the calculating the corresponding translation vector between the first part and the second part comprises:

calculating the corresponding n translation vectors between the first part and the second part according to the coordinates of the matched feature points in the n pairs of independent surround-view images of the first part and the second part and the corresponding n rotation angles;

the calculating the coordinates of the respective hinge points of the first part and the second part comprises:

based on a premise that the feature points in the independent surround-view images of the first part and the second part always rotate around their hinge points, calculating the coordinates of the respective hinge points of the first part and the second part based on the n rotation angles and the n translation vectors;

wherein the coordinates of the hinge points meet a requirement that the feature points in the independent surround-view image of the first part are closest to the coordinates of the corresponding matched feature points in the independent surround-view image of the second part after rotation and translation.

2. The method for vehicle hinge point calibration of claim 1, wherein the method for calculating the coordinates of the hinge points further comprises:

grouping the n pairs of independent surround-view images of the first part and the second part into m groups through grouping every two pairs of the n pairs of independent surround-view images of the first part and the second part into one group, where m is an integer greater than or equal to 1, and m is less than n;

based on a premise that the feature points in the independent surround-view images of the first part and the second part always rotate around their hinge points, calculating m groups of coordinates of the hinge points in total based on m groups of rotation angles and translation vectors between the first part and the second part; wherein, the coordinates of each group of the hinge points meet a requirement that the feature points in the independent surround-view image of the first part of this group are closest to the coordinates of the corresponding matched feature points in the independent surround-view image of the second part after rotation and translation;

ranking a calculation result of the m groups of coordinates of the hinge points, and determining a median value in a ranking result as the coordinates of the respective hinge points of the first part and the second part.

3. The method for vehicle hinge point calibration of claim 2, wherein a difference value of the rotation angle between the first part and the second part in each of the m groups of independent surround-view images is greater than a preset value.

4. The method for vehicle hinge point calibration of claim 1, wherein the obtaining the independent surround-view images of the first part and the second part of the vehicle comprises:

performing distortion correction on the raw images;

projecting corrected images into a geodetic coordinate system to generate airviews;

detecting and matching feature points of the airviews of the first part and feature points of the airviews of the second part respectively, and then performing fixed stitching to obtain respective fixed stitched images of the first part and the second part;

cropping the fixed stitched images to obtain the respective independent surround-view images of the first part and the second part.

5. A computer device comprising a memory and a processor, the memory storing a computer program, the processor, when executing the computer program, implementing steps of:

acquiring raw images of external environments of a first part and a second part of a vehicle hinged with each other;

adjusting, stitching and cropping the raw images to obtain respective independent surround-view images of the first part and the second part; and calculating a rotation angle and a corresponding translation vector between the first part and the second part based at least on the independent surround-view images of the first part and the second part, thereby calculating coordinates of respective hinge points of the first part and the second part;

wherein the calculating the rotation angle between the first part and the second part based on the independent surround-view images of the first part and the second part comprises:

detecting and matching feature points in n pairs of independent surround-view images of the first part and the second part; and calculating n rotation and translation matrices between the first part and the second part based on the coordinates of the matched feature points, and calculating the corresponding n rotation angles between the first part and the second part;

wherein each pair of the independent surround-view images of the first part and the second part corresponds to one rotation angle, and the n angles are different from each other, where n is an integer greater than or equal to 2;

wherein the calculating the corresponding translation vector between the first part and the second part comprises:

calculating the corresponding n translation vectors between the first part and the second part according to the coordinates of the matched feature points in the n pairs of independent surround-view images of the first part and the second part and the corresponding n rotation angles;

wherein the calculating the coordinates of the respective hinge points of the first part and the second part comprises:

based on a premise that the feature points in the independent surround-view images of the first part and the second part always rotate around their hinge points, calculating the coordinates of the respective hinge points of the first part and the second part based on the n rotation angles and the n translation vectors;

wherein, the coordinates of the hinge points meet a requirement that the feature points in the independent surround-view image of the first part are closest to the coordinates of the corresponding matched feature points in the independent surround-view image of the second part after rotation and translation.

6. A computer-readable storage medium on which a computer program is stored thereon, the computer program, when executed by a processor, implementing steps of:

acquiring raw images of external environments of a first part and a second part of a vehicle hinged with each other;

adjusting, stitching and cropping the raw images to obtain respective independent surround-view images of the first part and the second part; and calculating a rotation angle and a corresponding translation vector between the first part and the second part based at least on the independent surround-view images of the first part and the second part, thereby calculating coordinates of respective hinge points of the first part and the second part;

wherein the calculating the rotation angle between the first part and the second part based on the independent surround-view images of the first part and the second part comprises:

detecting and matching feature points in n pairs of independent surround-view images of the first part and the second part; and calculating n rotation and translation matrices between the first part and the second part based on the coordinates of the matched feature points, and calculating the corresponding n rotation angles between the first part and the second part;

wherein each pair of the independent surround-view images of the first part and the second part corresponds to one rotation angle, and the n angles are different from each other, where n is an integer greater than or equal to 2;

wherein the calculating the corresponding translation vector between the first part and the second part comprises:

calculating the corresponding n translation vectors between the first part and the second part according to the coordinates of the matched feature points in the n pairs of independent surround-view images of the first part and the second part and the corresponding n rotation angles;

wherein the calculating the coordinates of the respective hinge points of the first part and the second part comprises:

based on a premise that the feature points in the independent surround-view images of the first part and the second part always rotate around their hinge points, calculating the coordinates of the respective hinge points of the first part and the second part based on the n rotation angles and the n translation vectors;

wherein, the coordinates of the hinge points meet a requirement that the feature points in the independent surround-view image of the first part are closest to the coordinates of the corresponding matched feature points in the independent surround-view image of the second part after rotation and translation.

7. The computer device of claim 6, wherein the processor, when executing the computer program, further implements steps of:

grouping the n pairs of independent surround-view images of the first part and the second part into m groups through grouping every two pairs of the n pairs of independent surround-view images of the first part and the second part into one group, where m is an integer greater than or equal to 1, and m is less than n;

based on a premise that the feature points in the independent surround-view images of the first part and the second part always rotate around their hinge points, calculating m groups of coordinates of the hinge points in total based on m groups of rotation angles and translation vectors between the first part and the second part; wherein, the coordinates of each group of the hinge points meet a requirement that the feature points in the independent surround-view image of the first part of this group are closest to the coordinates of the corresponding matched feature points in the independent surround-view image of the second part after rotation and translation;

ranking a calculation result of the m groups of coordinates of the hinge points, and determining a median value in a ranking result as the coordinates of the respective hinge points of the first part and the second part.

8. The computer device of claim 7, wherein a difference value of the rotation angle between the first part and the second part in each of the m groups of independent surround-view images is greater than a preset value.

9. The computer device of claim 5, wherein the obtaining the independent surround-view images of the first part and the second part of the vehicle comprises:

performing distortion correction on the raw images;

projecting corrected images into a geodetic coordinate system to generate airviews;

detecting and matching feature points of the airviews of the first part and feature points of the airviews of the second part respectively, and then performing fixed stitching to obtain respective fixed stitched images of the first part and the second part;

cropping the fixed stitched images to obtain the respective independent surround-view images of the first part and the second part.

10. The computer-readable storage medium of claim 6, wherein the computer program, when executed by a processor, further implements steps of:

grouping the n pairs of independent surround-view images of the first part and the second part into m groups through grouping every two pairs of the n pairs of independent surround-view images of the first part and the second part into one group, where m is an integer greater than or equal to 1, and m is less than n;

based on a premise that the feature points in the independent surround-view images of the first part and the second part always rotate around their hinge points, calculating m groups of coordinates of the hinge points in total based on m groups of rotation angles and translation vectors between the first part and the second part; wherein, the coordinates of each group of the hinge points meet a requirement that the feature points in the independent surround-view image of the first part of this group are closest to the coordinates of the corresponding matched feature points in the independent surround-view image of the second part after rotation and translation;

ranking a calculation result of the m groups of coordinates of the hinge points, and determining a median value in a ranking result as the coordinates of the respective hinge points of the first part and the second part.

11. The computer-readable storage medium of claim 6, wherein the obtaining the independent surround-view images of the first part and the second part of the vehicle comprises:

performing distortion correction on the raw images;

projecting corrected images into a geodetic coordinate system to generate airviews;

detecting and matching feature points of the airviews of the first part and feature points of the airviews of the second part respectively, and then performing fixed stitching to obtain respective fixed stitched images of the first part and the second part;

cropping the fixed stitched images to obtain the respective independent surround-view images of the first part and the second part.

* * * * *